United States Patent
Netsu

(10) Patent No.: US 9,998,626 B2
(45) Date of Patent: Jun. 12, 2018

(54) SCANNER AND METHOD OF GENERATING IMAGE DATA

(71) Applicant: SEIKO EPSON CORPORATION, Tokyo (JP)

(72) Inventor: Takahiro Netsu, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days. days.

(21) Appl. No.: 15/405,683

(22) Filed: Jan. 13, 2017

(65) Prior Publication Data
US 2017/0223223 A1    Aug. 3, 2017

(30) Foreign Application Priority Data
Feb. 2, 2016   (JP) .................................. 2016-017720

(51) Int. Cl.
*H04N 1/03*   (2006.01)
*H04N 1/387*  (2006.01)
*H04N 1/028*  (2006.01)
*H04N 1/04*   (2006.01)

(52) U.S. Cl.
CPC ....... *H04N 1/3876* (2013.01); *H04N 1/02835* (2013.01); *H04N 1/0449* (2013.01); *H04N 2201/0081* (2013.01)

(58) Field of Classification Search
CPC .................. H04N 1/024; H04N 1/192; H04N 2201/0094; H04N 5/353; H04N 5/361; H04N 5/3696; H04N 5/378; H04N 9/045
USPC ........ 358/513, 514, 475; 348/E3.019, E5.08, 348/303, 241, 297, 300
See application file for complete search history.

(56) References Cited

U.S. PATENT DOCUMENTS

| | | | | |
|---|---|---|---|---|
| 4,835,615 | A * | 5/1989 | Taniguchi | H04N 5/353 348/297 |
| 4,870,505 | A * | 9/1989 | Mitsuki | H04N 1/047 358/471 |
| 8,345,325 | B2 | 1/2013 | Schmidt et al. | |
| 8,433,187 | B2 * | 4/2013 | Cohen | H04N 5/23212 356/4.01 |
| 9,706,073 | B2 * | 7/2017 | Shimatani | H04N 1/192 |
| 2012/0182448 | A1 * | 7/2012 | Cohen | G02B 7/36 348/231.99 |
| 2014/0139706 | A1 * | 5/2014 | Jang | H04N 9/045 348/241 |
| 2016/0286070 | A1 * | 9/2016 | Shimatani | H04N 1/192 |

(Continued)

FOREIGN PATENT DOCUMENTS

| | | |
|---|---|---|
| EP | 2091223 A1 | 8/2009 |
| JP | 4864021 B | 1/2012 |

*Primary Examiner* — Negussie Worku

(57) ABSTRACT

There is provided a scanner including: a first light source that generates light of a first wavelength; a mark that emits light in a case where light of the first wavelength is received; a deviation calculation section that calculates a deviation between a plurality of sensors based on sensor outputs acquired in such a way that the sensors detect light emitted from the same mark; a second light source that generates light which does not include light of the first wavelength; and an image generation section that generates image data based on the sensor outputs, acquired in such a way that the plurality of sensors detect light acquired when light from the second light source is stuck on and is reflected in the document, and the deviation.

6 Claims, 3 Drawing Sheets

(56) References Cited

U.S. PATENT DOCUMENTS

2018/0063359 A1\* 3/2018 Netsu .................. H04N 1/193
2018/0063456 A1\* 3/2018 Lee .................... H04N 5/3696

\* cited by examiner

SCANNER AND METHOD OF GENERATING IMAGE DATA

BACKGROUND

1. Technical Field

The present invention relates to a scanner.

2. Related Art

In the related art, a technology is known in which a document is scanned using a plurality of sensors and image data is generated by synthesizing sensor outputs detected by the respective sensors. For example, in technologies disclosed in Japanese Patent No. 4864021 and U.S. Pat. No. 8,345,325, a document is scanned in such a way that light from a document reading area passes through a prescribed optical path and reaches a plurality of sensors. In addition, in the technology disclosed in Japanese Patent No. 4864021, position correction markers are disposed in different positions in the sub-scanning direction for the document reading area, and it is possible to acquire a state in which light from the position correction markers reaches two sensors by changing an angle of a reflecting mirror in the optical path. Furthermore, data is acquired to correct the image data such that a deviation in a main scanning direction is solved based on signals which are read in the state.

In the above-described related arts, it is necessary to drive the reflecting mirror in order to acquire data to correct the image data. Accordingly, a mechanism which drives the reflecting mirror, a configuration which transmits power to the mechanism, and the like are necessary.

SUMMARY

An advantage of some aspects of the invention is that correction of image data is enabled with easy configuration.

According to an aspect of the invention, there is provided a scanner, which scans a document using a sensor, including: a first light source that generates light of a first wavelength; a mark that emits light in a case where light of the first wavelength is received; a deviation calculation section that calculates a deviation between a plurality of sensors based on sensor outputs acquired in such a way that the sensors detect light emitted from the same mark; a second light source that generates light which does not include light of the first wavelength; and an image generation section that generates image data based on the sensor outputs, acquired in such a way that the plurality of sensors detect light acquired when light from the second light source is stuck on and is reflected in the document, and the deviation.

In the scanner according to the aspect of the invention, light, which is emitted by the mark based on light of the first wavelength, and light, which is acquired in such a way that light from the second light source is stuck on and reflected in the document, are detected by the same sensor through the same (or approximately the same) optical path. Accordingly, it is possible to detect light from the mark and light reflected from the document using the sensors without providing a mechanism section which changes the optical path, a configuration which transmits power, and the like. Furthermore, in a case where the deviation between the sensors is calculated in advance based on light from the mark, sensor outputs of the respective sensors are synthesized based on the deviation, and thus it is possible to generate the image data indicative of a result of scanning of the document. Therefore, it is possible to generate the image data in which deviation is corrected with an easy configuration.

BRIEF DESCRIPTION OF THE DRAWINGS

The invention will be described with reference to the accompanying drawings, wherein like numbers reference like elements.

DESCRIPTION OF EXEMPLARY EMBODIMENTS

Here, embodiments of the invention will be described according to the following order.

(1) Configuration of scanner
(1-1) Configuration of mark
(1-2) Correction using mark
(2) Scanning process
(3) Another embodiment

(1) Configuration of Scanner

An embodiment will be described using a configuration of U.S. Pat. No. 8,345,325 to which a configuration as the embodiment of the invention is added. Meanwhile, "perpendicular" and "parallel" in the specification are not limited to "perpendicular" and "parallel" in the strict sense. Variations are allowed as far as an effect is shown.

Figure 1A:
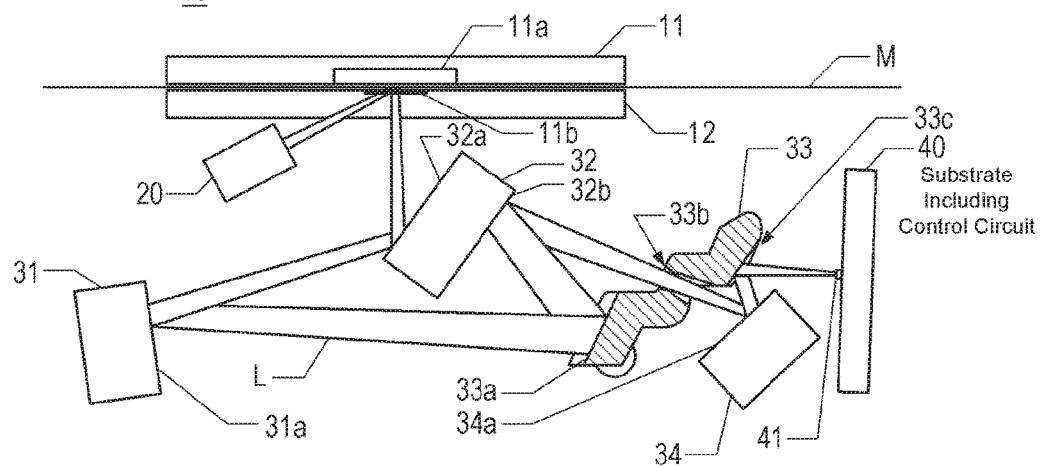
FIG. 1A is a schematic view illustrating main sections of a scanner according to an embodiment of the invention.
Figure 1B:
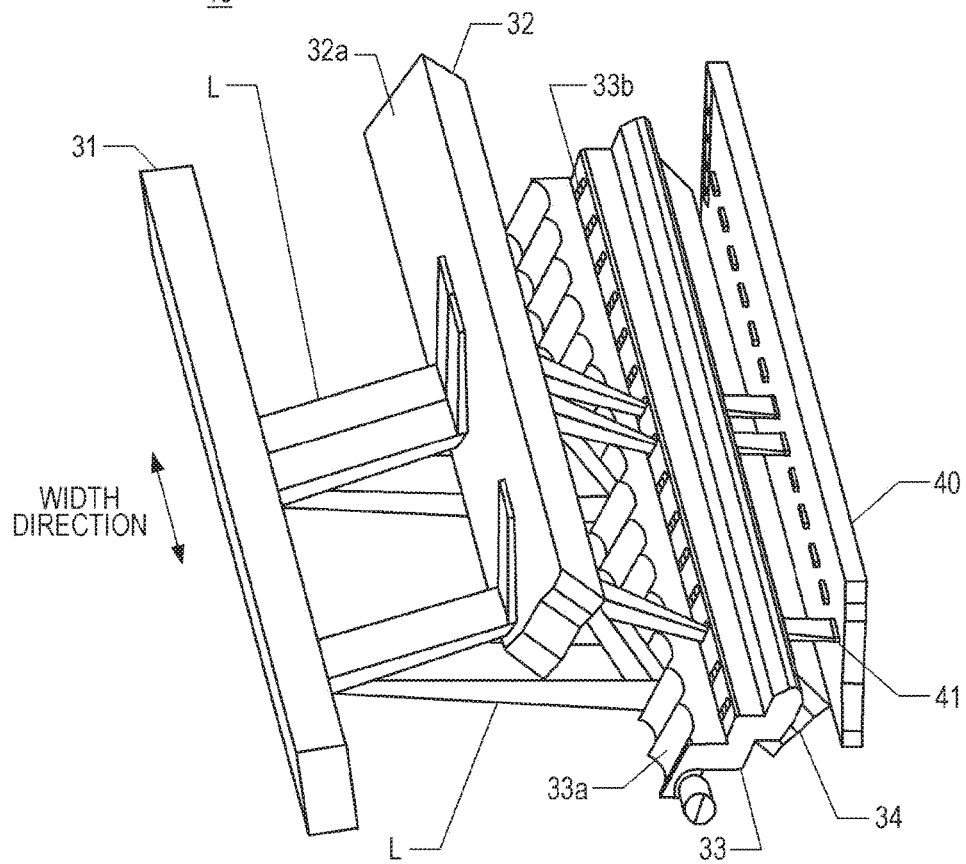
FIG. 1B is a perspective view illustrating the main sections of the scanner.
Figure 2A:
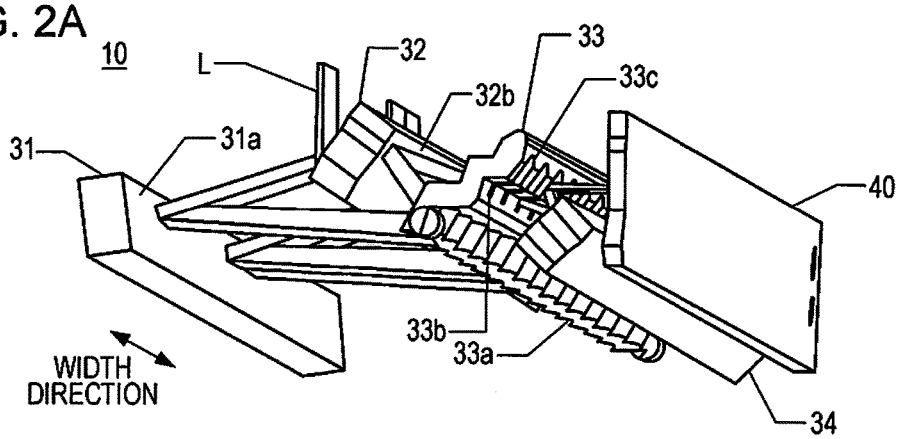
FIG. 2A is a perspective view illustrating the main sections of the scanner according to the embodiment of the invention.

FIGS. 1A, 1B, and 2A are views illustrating a configuration of a scanner according to the embodiment of the invention. Meanwhile, the drawings are described in such a way that the configuration as the embodiment of the invention is added to the configuration referred to from U.S. Pat. No. 8,345,325. That is, the embodiment of the invention may be realized by adding the configuration according to the invention to various scanners including scanners according to the related art. It is apparent that the configurations of the scanners are not limited to the configurations illustrated in the drawings and it is possible to realize the invention with various configurations. A scanner 10 according to the embodiment is a scanner which transports a document M using a sheet feeder, and reads the document M in a reading area in a transport path, FIG. 1A is a diagram illustrating a state in which a configuration of main sections of the scanner 10 is viewed from a direction which is parallel to a surface of the document M in the reading area, that is, which is perpendicular to a transport direction of the document M. FIGS. 1B and 2A are perspective views illustrating the main sections of the scanner 10. In FIGS. 1A, 1B, and 2A, components which form an optical path in the scanner 10 and members in the vicinity of the optical path are illustrated as the main sections, and a driving section, such as a transport mechanism of the document M, is omitted.

The scanner 10 includes a plate glass 12 and a cover 11, which is disposed in parallel to the surface of the glass 12, and the document M is transported between the glass 12 and the cover 11 by the sheet feeder which is not illustrated in the drawing. In the cover 11, a color reference plate 11a, which extends over a prescribed length (a length which is equal to or larger than a total width of the maximum size of the document M) of a document M in a width direction (see FIGS. 1B and 2A for the width direction), is attached to a position which faces a surface of the glass 12. The color reference plate 11a has a reference color in image data which is output by the scanner 10, and is reference white in the embodiment.

On an opposite side of the cover 11 which is viewed from the glass 12, a light source 20, flat mirrors 31, 32, and 34, a multi-purpose optical member 33, and a substrate 40 are provided. The light source 20 includes a first light source that generates infrared light which is invisible light, and a second light source that generates various color light of red, green, and blue (RGB). The second light source is capable of outputting light toward the color reference plate 11a which extends over a total width of the color reference plate 11a. In a case where light reaches the color reference plate 11a or the document M, light is irregularly reflected and the most of them travel toward the glass 12. In the embodiment, a principal component of the reflected light almost perpendicularly travels toward the surface of the glass 12.

Meanwhile, in FIGS. 1A, 1B, and 2A, some parts of the optical path are illustrated as an optical path L. Meanwhile, an infrared light output direction is set such that the first light source outputs infrared light which travels along the optical path L which is the same (or approximately the same) as in the second light source. However, a direction of the first light source may be formed such that infrared light reaches at least marks 11b which will be described later, infrared light may be output over the total width of the color reference plate 11a, or infrared light may be output toward only an area where the marks 11b exist. In addition, in the embodiment, light emitted from the marks 11b may reach a sensor 41, and thus the first light source may be formed such that the color reference plate 11a and the marks 11b are irradiated with infrared light from a position and a direction which are different from those of the second light source. It is possible to use various configurations as a configuration which causes a direction of the color reference plate 11a to be irradiated with light from the light source, and a configuration or the like may be provided in which light of the light source disposed in a specific position is converted into light which extends over the total width of the scanner using the light-guiding plate.

A flat mirror 32 is disposed at a travelling destination of light which is reflected in the color reference plate 11a or the document M. The flat mirror 32 is an approximately rectangular parallelepiped member which is long in the width direction. A surface 32a, which faces a side of the glass 12, and an opposite surface 32b include a mirror surface and a planar surface. Accordingly, in a case where light, which is reflected in the color reference plate 11a or the document M, reaches the surface 32a of the flat mirror 32, the light is specular reflected and further travels. The flat mirror 31 is disposed at a travelling destination of the light.

The flat mirror 31 is an approximately rectangular parallelepiped member which is long in the width direction. A surface 31a, which faces a side of the flat mirror 32, includes a mirror surface and a planar surface. Accordingly, in a case where light, which is reflected in the flat mirror 32, reaches the surface 31a of the flat mirror 31, light is specular reflected and further travels. The multi-purpose optical member 33 is disposed at a travelling destination of the light.

The multi-purpose optical member 33 is a member that includes a plurality of non-flat mirrors 33a and 33c and a plurality of diaphragms 33b. Each of the plurality of non-flat mirrors 33a has a recessed curved surface with a mirror surface (concave mirror). Accordingly, in a case where light, which is reflected in the flat mirror 31, reaches the non-flat mirror 33a of the multi-purpose optical member 33, the light is reflected and further travels while being condensed. The surface 32b of the flat mirror 32 exists at a travelling destination of the light.

In a case where light, which is reflected in the non-flat mirror 33a, reaches the surface 32b of the flat mirror 32, the light is specular reflected and further travels while being condensed. A diaphragm 33b of the multi-purpose optical member 33 exists at the travelling destination of the light. Accordingly, in a case where light, which is reflected in the flat mirror 32, reaches the diaphragm 33b, light further travels while the quantity of the light is squeezed. The flat mirror 34 is disposed at the travelling destination of the light.

The flat mirror 34 is an approximately rectangular parallelepiped member which is long in the width direction, and a surface 34a which faces a side of the multi-purpose optical member 33 includes a mirror surface and a planar surface. Accordingly, in a case where light which passes through the diaphragm 33b reaches the surface 34a of the flat mirror 34, the light is specular reflected and further travels. A non-flat mirror 33c of the multi-purpose optical member 33 exists at the travelling destination of the light.

The non-flat mirror 33c includes a mirror surface which reflects light such that incident light is converted into light which extends over a width of the sensor 41. That is, the sensor 41 is a sensor which includes a plurality of elements in the width direction, and a plurality of sensors 41 are arranged in the width direction on the substrate 40. In a case where light, which is reflected in the flat mirror 34, reaches the non-flat mirror 33c, the light is converted into light whose width is over a detection region of the sensor 41, and the light reaches the sensor 41. Accordingly, in a case where light reaches the sensor 41, strength of light is detected by the elements, and the sensor 41 outputs information indicative of the strength of light for each element. Meanwhile, in the embodiment, the sensor 41 is a sensor which detects strength of visible light.

As described above, in the embodiment, configuration is made such that light which extends over the total area in the width direction is reflected in a plurality of times and reaches the sensors 41. In addition, a plurality of non-flat mirrors 33a, which are concave mirrors, are provided in the optical path, and thus light which is incident into the non-flat mirrors 33a is condensed and a width thereof becomes narrow. Accordingly, light is separated into a plurality of light fluxes in the width direction in the course of traveling along the optical path. Therefore, it is possible to detect entire light, which exists over the whole area in the vicinity of the glass 12 in the width direction, by the plurality of sensors 41 which are arranged in the width direction on the substrate 40.

In addition, an end of each of the optical paths L, which are separated as described above, includes light which penetrates through the same part of the glass 12. That is, the pieces of output information from the ends of the plurality of adjacent sensors 41 are pieces of information which are acquired by reading overlapping areas. Here, in the embodiment, in a case where the document M is read, the scanner 10 removes parts which are repeatedly read by the sensors 41, and generates image data corresponding to one line by performing synthesis such that the document M is reproduced.

(1-1) Configuration of Mark

However, in a position of each of the sensors 41 of the substrate 40, errors for a fixed position may be generated. That is, in a case where a position of any one of members, such as the sensors 41 and the multi-purpose optical member 33, which exist in the optical path L is deviated from a designed position due to production variation and thermal expansion, a state is acquired in which errors are generated in the positions of the sensors 41. Here, in the embodiment, a configuration is used in which the errors are corrected by marks included in the scanner 10.

In the embodiment, the marks 11b are formed on a surface of the glass 12, on which the document M is mounted, as illustrated in FIG. 1A. The marks 11b are formed in the reading area superimposed by the plurality of sensors 41. Accordingly, in the embodiment, the plurality of marks 11b are arranged in the width direction. In the embodiment, the marks 11b are materials which emit fluorescent light in a case where infrared light (light of a first wavelength) output from the first light source is received and through which respective pieces of color light of RGB output from the second light source to penetrate, and are formed of invisible ink (Europium (Eu) chelate compound) which is a fluorescent material. Meanwhile, in the embodiment, fluorescent light, which is generated from the marks 11b, is visible light.

In the embodiment, in a case where the document M is scanned, the document M is irradiated with respective pieces of color light of RGB from the second light source of the light source 20. Accordingly, in a case where the marks 11b exist in the optical path of light which is output from the second light source of the light source 20, light output from the light source 20 penetrates through the marks 11b and reaches the document M. Thereafter, the light is reflected in the document M, further penetrates through the marks 11b, passes through the glass 12, and travels. Accordingly, even though the marks 11b exist in the optical path of light output from the second light source of the light source 20 in order to read the document M, the light reaches the sensors 41 with strength to which content of the document M is reflected. Therefore, it is possible to perform scanning without being influenced by the marks 11b.

Furthermore, in the embodiment, the principal component of light reflected from the document M almost perpendicularly travels toward the surface of the glass 12. Accordingly, light, which is acquired in such a way that light output from the second light source of the light source 20 is stuck on and reflected in the document M, perpendicularly penetrates through the marks 11b. Therefore, it is possible to realize a state in which reflection attributable to a difference between refractive indexes is not generated (or can be ignored) from the marks 11b, and thus it is possible to perform scanning without being influenced by the marks 11b.

(1-2) Correction Using Mark

In contrast, correction of image data is realized in such a way that the marks 11b are scanned in advance using light of the first light source of the light source 20 and a deviation is calculated. That is, light of the first light source of the light source 20 is output before the document M is scanned, and calculation of the deviation is performed based on the sensor outputs acquired in a case where fluorescent light generated from the marks 11b due to the light is detected by the sensors 41.

The substrate 40 of the scanner 10 is provided with a control circuit which includes a CPU, a ROM, a RAM, and the like that are not illustrated in the drawing. In a case where the control circuit executes a prescribed program, a deviation is calculated and image data, which is corrected based on the deviation, is generated. As described above, in the embodiment, the control circuit functions as a deviation calculation section and an image generation section.

The deviation calculation section, which is realized by the control circuit, calculates a deviation between sensors based on the sensor output which is acquired in such a way that the plurality of sensors detect light emitted from the same marks 11b (the marks 11b which exist in the reading area superimposed by the plurality of sensors 41) from among the plurality of marks 11b which are arranged in the width direction. The deviation may be defined such that relative deviations between the sensors can be corrected, and, in the embodiment, includes information indicative of an element that detects light from the same mark 11b in each sensor 41 and information indicative of relative inclined angles of the plurality of sensors 41.

Figure 2B:
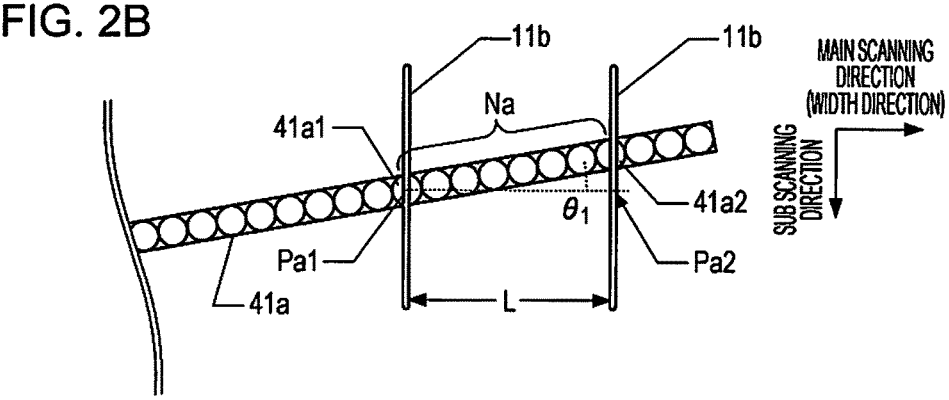
FIGS. 2B and 2C are schematic views illustrating a relationship between marks and a sensor.
Figure 2C:
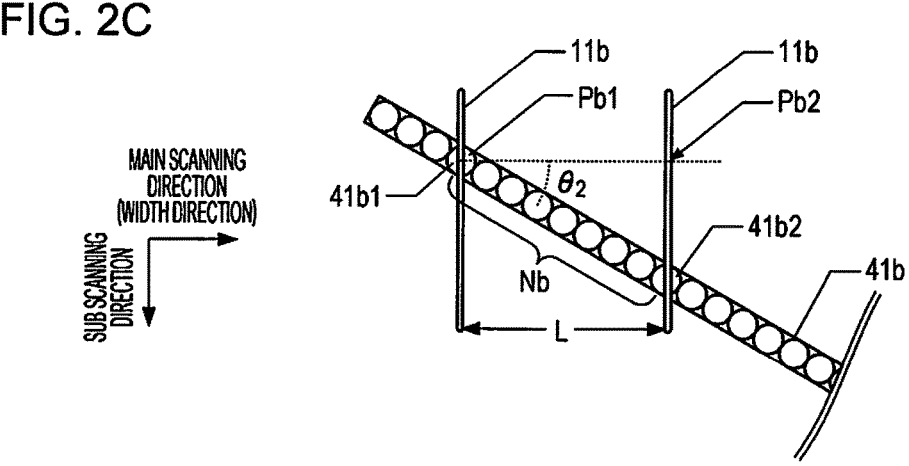

The marks 11b can be realized in various shapes. In the embodiment, the marks 11b are formed by two straight lines which are parallel to a sub-scanning direction (direction which is perpendicular to the width direction). FIGS. 2B and 2C are views schematically illustrating a relationship between the marks 11b and the sensors 41. As illustrated in the drawings, the marks 11b are provided with two straight lines which are parallel to the sub-scanning direction in the reading area that is superimposed by two sensors. That is, in a case where the number of sensors is set to N, the shapes of the marks have 2(N−1) straight lines in total.

In contrast, in the embodiment, the sensors 41 are line sensors in which the elements are arranged in one direction. In a case where the sensors 41 are appropriately attached to the substrate 40, a direction in which the elements are arranged coincides with the main scanning direction. FIGS. 2B and 2C schematically illustrate a positional relationship between the sensors 41a and 41b and the marks 11b. The sensors 41a and 41b are sensors which detect the same marks 11b. Since, in the sensor 41a illustrated in FIG. 2B, elements are arranged in the main scanning direction, the sensor 41a is the sensor 41 which is appropriately attached to the substrate 40. Since, in the sensor 41b illustrated in FIG. 2C, a direction in which elements are arranged is inclined against the main scanning direction, the sensor 41b is the sensor 41 which is attached in a state being inclined by appropriate direction against the substrate 40. Meanwhile, the sizes of the sensors 41a and 41b and the marks 11b illustrated in FIGS. 2B and 2C are sizes for description, and relative magnitude relationship is may be different from an actual relationship. In addition, FIG. 2C emphasizes and illustrates a direction in which the sensors 41b are inclined.

Since the marks 11b include straight lines which are parallel to the sub-scanning direction, it is possible to use the straight lines as references for specifying relative deviations of the sensors 41a and 41b in the main scanning direction. In a case where scanning is performed by the sensors 41a and 41b in a state in which light is output from the first light source light source 20, each of the sensors 41a and 41b detects two images acquired by reflecting the shapes of the marks 11b based on fluorescent light from the marks 11b.

For example, in the sensor 41a illustrated in FIG. 2B, the marks 11b are detected by elements 41a1 and 41a2. In addition, in the sensor 41b illustrated in FIG. 2C, the marks 11b are detected by elements 41b1 and 41b2. Furthermore, in a case where elements which detect the same straight line are specified in both the sensors 41a and 41b, image data is generated by superimposing output data of both the elements, and thus it is possible to correct the deviation between the sensors 41a and 41b in the main scanning direction.

For example, in a case where the element 41*b*1 on a side of an end of the sensor 41*b* and an element 41*a*1 on a side of a non-end of the sensor 41*a* are specified as elements, which detect the same straight line, among the elements which detect the marks 11*b*, it is possible to generate image data by superimposing the output data of both the elements, and thus it is possible to correct the deviation between the sensors 41*a* and 41*b* in the main scanning direction. It is apparent that the elements, which are specified as elements that detect the same straight line, may be an element 41*a*2 of the sensor 41*a* and an element 41*b*2 of the sensor 41*b*.

In the embodiment, the marks 11*b* are formed in which two straight lines are arranged in the main scanning direction, and thus it is difficult to specify deviation in the sub-scanning direction. However, in the embodiment, it is possible to specify an inclination of a sensor based on a gap between two straight lines detected by the sensor. That is, in the embodiment, relative positions in the main scanning direction, which are the relative positions of the sensors, and relative inclinations of the sensors are acquired based on the marks. Since it is possible to calculate the deviation between the sensors in the sub-scanning direction based on deviation of a timing at which a tip of the document is started to be detected, it is possible to generate the image data using the relative positions of the sensors in the main scanning direction and the relative inclinations of the sensors.

In the marks 11*b* according to the embodiment, the number of elements corresponding to the interval between the two straight lines which are detected in the sensors 41*a* and 41*b* is calculated in order to acquire the inclinations of the sensors. Furthermore, it is possible to calculate an inclination angle $\theta1$ of the sensor 41*a* as arccos (L/Na) using an interval Na between the two straight lines, which is calculated based on the number of elements measured in the sensor 41*a*, and an actual interval L between the two straight lines. Similarly, it is possible to acquire a relative inclination between the sensors 41*a* and 41*b* by calculating an inclination angle $\theta2$ of the sensor 41*b*.

For example, in the examples illustrated in FIGS. 2B and 2C, 8 is measured as the number of elements which exit from the element 41*a*1 to the element 41*a*2 that detect the marks 11*b* in the sensor 41*a*. In addition, in a case where an interval per one element is $\Delta P$, the interval Na between the two straight lines, which is calculated based on the number of elements, is 8 $\Delta P$. Accordingly, the inclination angle $\theta1$ is acquired by arccos (L/8 $\Delta P$). Furthermore, 9 is measured as the number of elements, which exist from the element 41*b*1 to the element 41*b*2 that detect the marks 11*b* in the sensor 41*b*. In addition, an interval Nb between the two straight lines calculated based on the number of elements is 9 $\Delta P$. Accordingly, the inclination angle $\theta2$ is acquired by arccos (L/9 $\Delta P$). Meanwhile, a negative value and a positive value may mathematically exist as the inclination angles $\theta1$ and $\theta2$. Therefore, in a case of inclinations in directions reverse to each other as $\theta1$ illustrated in FIG. 2B and $\theta2$ illustrated in FIG. 2C, any one of them may be a positive value and the other one may be a negative value. Furthermore, since lengths of the two straight lines of the marks 11*b* according to the embodiment are the same, it is possible to specify an inclined direction by specifying one of the elements 41*b*1 and 41*b*2, which starts to detect the tip of the document first.

In a case where the inclination angles $\theta1$ and $\theta2$ of the respective sensors 41*a* and 41*b* against a reference direction (main scanning direction in the embodiment) are acquired, it is possible to correct deviation (inclination) of the sensors 41*a* and 41*b* in the sub-scanning direction. The correction may be realized using various methods. For example, in a case where, the elements 41*a*1 and 41*b*1, which are used to correct deviation in the main scanning direction in the sensor 41*b*, are used as reference, the number of elements up to an arbitrary element is Nr, and image data is generated using information detected in a position separated by a distance Nr(sin($\theta$)), it is possible to generate the image data in a state in which the inclination is corrected.

For example, in a case where it is assumed that information, detected by the element 41*a*1 at a position Pa1, and information, detected by the element 41*a*2 at a position Pa2 which is separated from the element 41*a*2 by a distance Na(sin($\theta1$)) in the sub-scanning direction, form image data on the same line, it is possible to generate the image data in a state in which an inclination is corrected. Meanwhile, in a case where movement amount $\Delta L$ of the document M is specified in advance in one time of sub-scanning, it is possible to specify the information detected in the position Pa2 as information detected by the element 41*a*2 after Na(sin($\theta1$))/$\Delta L$ times. In contrast, in a case where it is assumed that information, detected by the element 41*b*1 at a position Pb1, and information, detected by the element 41*b*2 at a position Pb2 which is separated from the element 41*b*2 by a distance Nb(sin($\theta2$)) in the sub-scanning direction, form image data on the same line, it is possible to generate image data in a state in which an inclination is corrected. Meanwhile, in a case where movement amount $\Delta L$ of the document M is specified in advance in one time of sub-scanning, it is possible to specify the information detected in the position Pb2 as information detected by the element 41*b*2 before Nb(sin($\theta2$))/$\Delta L$ times.

(2) Scanning Process

Figure 3:
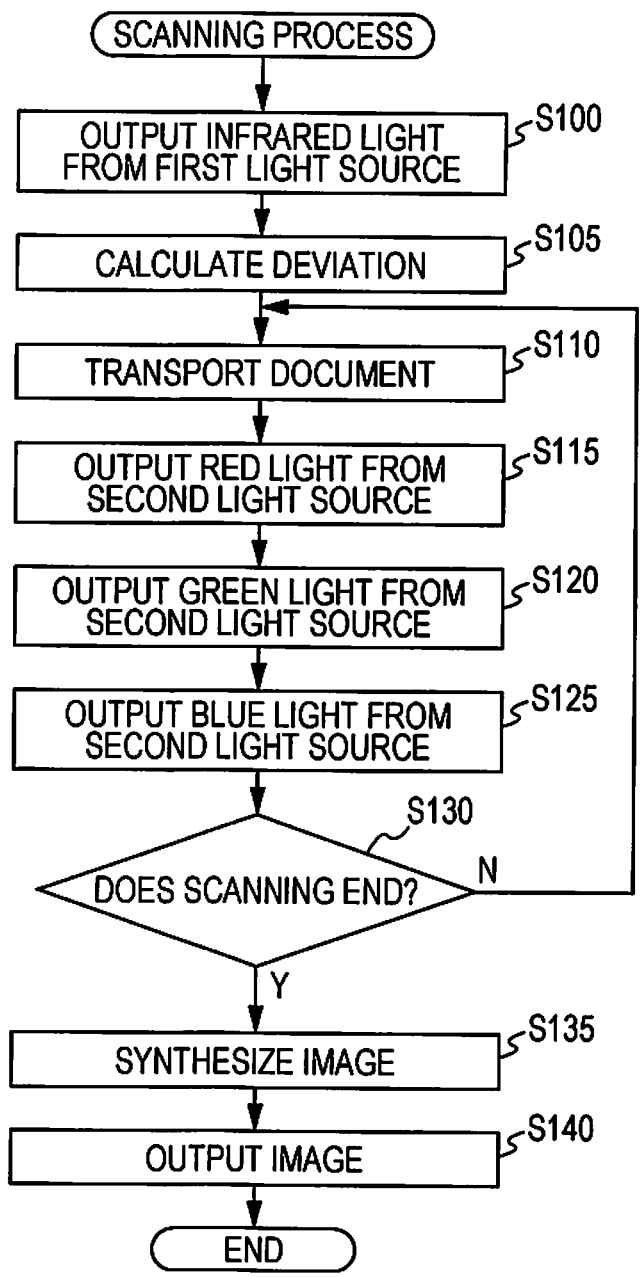
FIG. 3 is a flowchart illustrating a scanning process.

Subsequently, a scanning process, which is performed in such a way that the control circuit mounted on the above-described substrate 40 functions as the deviation calculation section and the image generation section, will be described in detail. FIG. 3 is a flowchart illustrating the scanning process. The scanning process illustrated in FIG. 3 starts in such a way that a user gives a scanning instruction using an operation section, which is included in the scanner 10 and is not illustrated in the drawing, in a state in which, for example, the document M is set in the sheet feeder of the scanner 10.

In a case where the scanning process starts, the control circuit causes the first light source to output infrared light (step S100). That is, the control circuit controls the light source 20 through a signal line which is not illustrated in the drawing according to a process performed by the deviation calculation section, and causes infrared light to be output from the first light source. As a result, infrared light reaches the color reference plate 11*a*, is reflected in the color reference plate 11*a*, and reaches the marks 11*b*. In a case where infrared light reaches the marks 11*b*, fluorescent light of visible light is generated from the marks 11*b*. Fluorescent light travels through the optical path L illustrated in FIGS. 1A, 1B, and 2A and reaches the plurality of sensors 41. Accordingly, each of the sensors 41 outputs data indicative of a result of detection of the marks 11*b*.

Subsequently, the control circuit calculates deviation (step S105). That is, the control circuit acquires sensor outputs of the respective sensors 41 according to the process performed by the deviation calculation section. Specifically, the control circuit specifies elements, which detect the same straight line, in the respective sensors 41 based on the sensor outputs of the plurality of sensors 41 which read the marks 11*b* that exist in the same area. In the above-described examples illustrated in FIGS. 2B and 2C, the control circuit specifies the elements 41a1 and 41b1.

Furthermore, the control circuit specifies the number of elements corresponding to the distance between the two straight lines, which for the marks 11b, in the main scanning direction in each of the sensors 41, and specifies an inclination angle θ of another-side sensor for one-side sensor. The control circuit performs the above-described process for the respective areas where the marks 11b exist, and calculates the deviation between sensors which are adjacent to each other for the plurality of sensors 41.

Subsequently, the control circuit transports the document (step S110). That is, the control circuit controls a driving unit of the sheet feeder which is not illustrated in the drawing through a signal line which is not illustrated in the drawing. In a case where step S110 is executed for the first time in a procedure of a loop process, the control circuit transports the document M up to a reading start position by controlling the sheet feeder. In a case where step S110 is executed after the second time in the procedure of the loop process, the control circuit transports the document M by a prescribed transport amount ΔL in the sub-scanning direction by controlling the sheet feeder. As a result, the document M is transported in the transport path of the document M in a prescribed sequence and the transport amount.

In a case where the prescribed transport is performed in step S110, the control circuit outputs red light from the second light source (step S115). That is, the control circuit controls the light source 20 through the signal line which is not illustrated in the drawing, and causes red light to be output from the second light source. As a result, red light travels through the optical path L, and red light reaches the plurality of sensors 41 with strength in which the content of the document M is reflected. In a case where the sensor outputs are acquired from the respective sensors 41, the control circuit maintains the sensor outputs in a memory which is not illustrated in the drawing.

Subsequently, the control circuit causes the second light source to output green light (step S120). That is, the control circuit controls the light source 20 through the signal line which is not illustrated in the drawing, and causes green light to be output from the second light source. As a result, green light travels through the optical path L, and green light reaches the plurality of sensors 41 with strength in which the content of the document M is reflected. In a case where the sensor outputs are acquired from the respective sensors 41, the control circuit maintains the sensor outputs in the memory which is not illustrated in the drawing.

Subsequently, the control circuit causes the second light source to output blue light (step S125). That is, the control circuit controls the light source 20 through the signal line which is not illustrated in the drawing, and causes blue light to be output from the second light source. As a result, blue light travels through the optical path L, and blue light reaches the plurality of sensors 41 with strength in which the content of the document M is reflected. In a case where the sensor outputs are acquired from the respective sensors 41, the control circuit maintains the sensor outputs in the memory which is not illustrated in the drawing.

Subsequently, the control circuit determines whether or not the scanning ends (step S130). That is, the control circuit determines that the scanning ends in a case where step S110 is performed a predetermined number of times after the second time. In a case where it is not determined that scanning ends in step S130, the control circuit repeats processes performed after step S110. In contrast, in a case where it is determined that scanning ends in step S130, the control circuit further transports the document M, discharges the document M from a transport path, and subsequently performs a process performed by the image generation section.

Specifically, the control circuit synthesizes images for respective colors according to the process performed by the image generation section (step S135). That is, the control circuit corrects inclinations of the sensors inclined against a reference sensor based on an inclination angle θ. In the above-described examples of FIGS. 2B and 2C, the control circuit performs a process of regarding an output image of the element 41a1 of the sensor 41a and an output image scanned after Na(sin(θ1))/ΔL times in the element 41a2 as an image on the same line. In addition, the control circuit performs a process of regarding an output image of the element 41b1 of the sensor 41b and an output image scanned after Nb(sin(θ2))/ΔL times in the element 41b2 as an image on the same line.

Furthermore, the control circuit causes image data generated by red light, image data generated by green light, and image data generated by blue light to be superimposed, respectively, such that output images of elements which detect the same straight line are superimposed. According to the above-described example illustrated in FIGS. 2B and 2C, the control circuit causes the output image of the element 41a1 to be superimposed on the output image of the element 41b1. Meanwhile, in parts where the output images of the plurality of sensors 41 are superimposed, any one side of the images may be used and the others may be omitted, or an image may be generated based on statistics (evaluation or the like of image gradation values) of both sides.

The control circuit performs the above-described processes in respective areas where the marks 11b exist, and generates image data, in which the deviation between sensors adjacent to each other is solved, for the plurality of sensors 41. Furthermore, the control circuit performs the above-described process on each of the lines, thereby generating an image as a result of scanning of the document M.

Subsequently, the control circuit outputs an image (step S140). That is, the scanner 10 outputs the image data acquired through the synthesis in step S135 to a predetermined output destination (an external storage medium or the like which can be connected to a computer or the scanner 10 connected through a communication line). As a result, the user is capable of using the image data in the output destination. In the above-described scanner 10, both light, emitted from the marks 11b based on the infrared light, and light, acquired in such a way that light from the second light source is stuck on and reflected in the document M, pass through the same optical path L and reach the same sensor 41.

Accordingly, it is possible to detect light from the marks 11b and light reflected from the document using the sensors without providing a mechanism section which changes the optical path L, a configuration which transmits power, or the like. Furthermore, light from the second light source reaches the sensors 41 in a state in which the content of the document M is reflected without influencing the marks 11b. Therefore, in a case where the deviation between the sensors is calculated in advance based on light from the marks 11b, it is possible to synthesize the sensor outputs of the respective sensors, which are acquired in such a way that the document M is irradiated by the second light source, based on the deviation, and thus it is possible to generate the image data indicative of a result of the scanning of the document.

Accordingly, it is possible to generate the image data in which the deviation is corrected with an easy configuration.

(3) Another Embodiment

The above-described embodiment is an example for applying the invention. In a configuration in which the document is scanned using the second light source, which does not include light of the first wavelength, it is possible to apply other various embodiments in so far as the deviation between the sensors is calculated using the marks which emit light in a case where light of the first wavelength is received and the image data is generated. For example, the scanner according to the invention may be provided to a multi-function machine which is an electronic apparatus that is used for another object.

Furthermore, steps S100 and S105 may be performed in advance before the scanning process illustrated in FIG. 3 is performed, and steps S100 and S105 may be omitted from the scanning process. Furthermore, in steps S115 to S125 of the scanning process illustrated in FIG. 3, visible light is output in order of red, green, and blue. However, it is apparent that the lighting sequence of visible light is arbitrary. In addition, light (normally white light), which includes three components of red, green, and blue, may be generated from the second light source, and the three components may be separated and detected on sides of the sensors. It is apparent that it is possible to apply the invention to an apparatus which performs monochrome scanning by generating visible light of one color and detecting the only one color using sensors. In addition, the marks may be detected using infrared light after the document is scanned using visible light, and then the image synthesis may be performed. In addition, image processes, such as color conversion, oblique motion correction, and dust removal, in addition to the image synthesis may be performed either before or after the image synthesis is performed, or may be simultaneously performed.

Furthermore, the configuration of the marks 11b and the method of calculating deviation are not limited to the above-described example illustrated in FIGS. 2B and 2C, and it is possible to use other various configurations. For example, it is possible to solve deviation using a mark which includes one straight line. Specifically, in the examples illustrated in FIGS. 2B and 2C, in a case where an inclination of the sensor 41b against the sensor 41a is approximately 0 and a relative deviation between both the sensor 41b and the sensor 41a is mostly only in the main scanning direction, the marks 11b may include one straight line which is parallel to the sub-scanning direction. Furthermore, in a case where the control circuit superimposes the image data such that the output images of the elements which detect the straight lines, it is possible to generate image data in which the deviation between the sensors is solved. Otherwise, marks may be used which enable any of a deviation in the main scanning direction, a deviation in the sub-scanning direction, and a deviation in rotation to be calculated.

Meanwhile, the scanner may scan the document and the form thereof is not limited. For example, scanning may be performed in such a way that the document moves or the sensors move. The sensors may scan at least the marks and the document, and may be line sensors or area sensors.

The first light source may generate light of the first wavelength, light of the first wavelength may be light which causes light to be generated from the marks in a case where the marks are irradiated with light of the first wavelength, and light emitted from the marks may be detected by the sensors. The first light source may be provided in the scanner such that the optical path, through which light from the first light source reaches the marks and the sensors, is formed. Meanwhile, the optical path may be provided using various structures. For example, the optical path may be formed using any one of the diaphragm, the lens, the reflecting mirror, and the like, or the combinations thereof. For example, a light source which outputs invisible light (infrared light, ultraviolet light, and the like) and a light source which outputs visible light may be considered as the first light source.

The marks may be materials which emit light in a case where light of the first wavelength is received, and may be formed in the optical path. The marks may be formed in arbitrary positions in the optical path, and a configuration may be considered in which the marks are formed in an object in the optical path, for example, a document stand or the color reference plate of the glass, a glass cover, a lens, or the like. Light which is emitted from the marks after light of the first wavelength is received may be light reflected in the marks, or may be fluorescent light from the marks. The latter is realized in such a way that the marks are formed of a fluorescent material.

Meanwhile, in a configuration in which the marks are disposed in the optical path to non-operated sensors and light from the first light source and light from the second light source reach the sensors through the same or approximately the same optical path, the marks may be irradiated with light from the second light source. Accordingly, a configuration is preferable in which, in a case where the marks receive light from the second light source, light is not emitted toward the sensors (or it is possible to scan the document by ignoring light even though light is emitted). For example, visible light of a wavelength which is different from light from the second light source may be generated.

An example, in which the marks are materials through which light from the second light source is penetrated, may be considered as an example of the configuration. For example, invisible ink, which is formed of special fluorescent dyes, may be considered as the materials. That is, in a case where the second light source is the light source of the visible light and the invisible ink is formed of Europium (Eu) chelate compound, it is possible to acquire light reflected in the document without being influenced by the mark even though the mark is irradiated with visible light emitted from the second light source, and thus it is possible to perform scanning.

The deviation calculation section may calculate the deviation between the sensors based on the sensor outputs acquired in such a way that the plurality of sensors detect light emitted from the same mark. That is, although the scanner includes the plurality of sensors and the respective sensors are attached to prescribed positions of the scanner, errors may be generated in actual attachment positions. In a case where errors are generated in the attachment positions of the sensors, it is difficult to acquire appropriate image data even though the sensor outputs detected by the respective sensors are synthesized on the assumption that error is 0.

Here, the deviation calculation section calculates the deviation between the sensors. The deviation may be defined such that it is possible to correct deviation between images for respective sensors, and may be acquired in various aspects. For example, the positions of the respective sensors may be specified in an arbitrary coordinate system, a relative deviation between the sensors may be specified in the arbitrary coordinate system, and elements which detect light from the same mark may be specified in each sensor.

Meanwhile, the same mark may be defined such that it is possible to correct the deviation, various shapes may be used as the shape of the mark, and a figure which can be regarded as the same mark may be defined in advance.

The second light source may generate light which does not include light of the first wavelength. That is, the second light source may be formed such that, even in a case where the marks are irradiated with light from the second light source, light is not emitted from the marks, light from the marks is ignored when the document is scanned, or light from the marks does not reach the sensors. In a case where a small amount of light, which is negligible when the document scan, is emitted from the marks, strictly, the second light source may be considered as light which does not include light of the first wavelength even though the second light source generates light which includes light of the first wavelength. The second light source may be provided in the scanner such that an optical path, through which light from the second light source reaches the document and the sensors, is formed. For example, a light source or the like, which outputs visible light (chromatic color light, white light, and the like), may be considered as the second light source.

The image generation section may generate the image data based on the sensor output, which is acquired in such a way that the plurality of sensors detect light when light from the second light source is stuck on and reflected in the document, and the deviation. That is, the respective sensors scan the content of the document based on light reflected from the document. Although the plurality of sensors scan a prescribed part of the document, ends of the respective parts are repeatedly scanned by different sensors. Here, the image generation section generates the image data by synthesizing the sensor outputs of the respective sensors based on the deviation calculated by the deviation calculation section.

Here, the image generation section may synthesize the image data such that a situation, in which a specific part of the document appears a plurality of times in the image data, and a situation, in which a specific part of the document does not appear in the image data, do not occur. For example, a configuration may be provided in which the image generation section superimposes the image data such that output images of the elements which detect light from the same mark are superimposed. According to the configuration, even though the sensors are deviated from prescribed positions, it is possible to generate the image data by appropriately superimposing the sensor outputs of the respective sensors. Meanwhile, in the configuration in which the output images of the elements which detect light from the same mark are superimposed, one of the superimposed output images may be removed in the periphery of the superimposed parts, and a pixel gradation value may be determined based on an evaluation value or the like of both sides.

The marks may be disposed on the optical path between the first light source and the sensors. Meanwhile, as an example of the configuration, positions of the marks may be determined such that the optical path, acquired until light acquired in such a way that light from the second light source is stuck on and reflected in the document reaches the sensors, perpendicularly penetrates the marks. That is, in a case where light perpendicularly penetrates the marks in the optical path, it is possible to realize a state in which reflection due to a difference between refractions or refractive indexes is not generated (or can be ignored) from the marks, and thus it is possible to perform scanning without being influenced by the mark.

Furthermore, the marks may be realized in various shapes. Meanwhile, as an example of the configuration, a configuration may be used in which the marks include a straight line which is parallel to at least one of the main scanning direction the sub-scanning direction. That is, in a case where the marks include a straight line which is parallel to the main scanning direction, the straight line part becomes reference in order to specify a deviation between the sensors in the sub-scanning direction. In addition, in a case where the marks include a straight line which is parallel to the sub-scanning direction, the straight line part becomes reference in order to specify a deviation between sensors in the main scanning direction. Here, in a case where the marks which include the straight line are used, it is possible to easily calculate a deviation in at least one of the main scanning direction and the sub-scanning direction and to correct the image data. That is, in a case where the image data is generated in such a way that the image generation section superimposes the output images of the elements which detect the straight line in the plurality of sensors, it is possible to generate appropriate image data by correcting the deviation.

Meanwhile, the main scanning direction and the sub-scanning direction are directions which are determined in advance, and, generally, both directions are perpendicular to each other. In addition, for example, a longitudinal direction, in which elements are arranged in the line sensor or the area sensor, may be considered as the main scanning direction, and, for example, a direction in which the document or the sensors move may be considered as the sub-scanning direction. Meanwhile, a size and a direction of the optical path, which includes the marks, may be changed in a case of being observed from the outside using a lens, a diaphragm, a reflecting mirror, or the like. Meanwhile, even though the optical path is changed, the main scanning direction and the sub-scanning direction are defined in every position in the optical path such that the main scanning direction and the sub-scanning direction are consistent with the definition of the directions. Accordingly, for example, in various positions, such as periphery of the sensors and periphery of the marks, the main scanning direction and the sub-scanning direction are defined to be consistent with each other.

Furthermore, as described above, in a configuration in which a document is scanned using the second light source, which does not include light of the first wavelength, the deviation between the sensors are calculated using the marks that emit light in a case where light of the first wavelength is received, and it is possible to realize the method of generating the image data as the invention of a method or the invention of an image data generation method.

What is claimed is:

1. A scanner, which scans a document using a sensor, the scanner comprising:
a first light source that generates light of a first wavelength;
a mark including a material that emits light in a case where light of the first wavelength is received;
a deviation calculation section that calculates a deviation between a plurality of sensors based on sensor outputs acquired by the sensors that detect light emitted from the same mark;
a second light source that generates light which does not include light of the first wavelength; and
an image generation section that generates image data based on the deviation, and the sensor outputs acquired by the plurality of sensors that detect light generated by the second light source and reflected on the document.

2. The scanner according to claim 1,
wherein the material of the mark is a material through which light from the second light source penetrates.

3. The scanner according to claim 1,
wherein the material of the mark is a fluorescent material.

4. The scanner according to claim 1,
wherein the mark is located in a position in which light, generated by the second light source and reflected on the document, perpendicularly penetrates the mark in an optical path until reaching the sensor.

5. The scanner according to claim 1,
wherein the mark includes a straight line that is parallel to at least one of a main scanning direction and a sub-scanning direction, and
the image generation section generates the image data by superimposing output images of elements that detect the straight line in the plurality of sensors.

6. A method of generating image data comprising:
irradiating a mark, including a material which emits light in a case where light of a first wavelength is received, with light of a first wavelength from a first light source;
calculating a deviation between a plurality of sensors based on sensor outputs acquired by the sensors that detect light emitted from the same mark; and
irradiating a document with light from a second light source that generates light which does not include light of the first wavelength, and generating image data based on the deviation, and the sensor outputs acquired by the plurality of sensors that detect light generated by the second light source and reflected on the document.

\* \* \* \* \*